United States Patent
Sato et al.

(10) Patent No.: US 12,348,086 B2
(45) Date of Patent: Jul. 1, 2025

(54) MAGNET ARRANGEMENT METHOD AND ROTOR MANUFACTURING METHOD

(71) Applicant: TOYOTA JIDOSHA KABUSHIKI KAISHA, Toyota (JP)

(72) Inventors: Kazuhiro Sato, Toyota (JP); Kei Ohta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 18/548,257

(22) PCT Filed: Jan. 28, 2022

(86) PCT No.: PCT/JP2022/003361
§ 371 (c)(1),
(2) Date: Aug. 29, 2023

(87) PCT Pub. No.: WO2022/196128
PCT Pub. Date: Sep. 22, 2022

(65) Prior Publication Data
US 2024/0120788 A1   Apr. 11, 2024

(30) Foreign Application Priority Data

Mar. 18, 2021   (JP) .................................. 2021-044585

(51) Int. Cl.
*H02K 1/2783* (2022.01)
*H02K 15/03* (2025.01)

(52) U.S. Cl.
CPC ........... *H02K 1/2783* (2022.01); *H02K 15/03* (2013.01)

(58) Field of Classification Search
CPC .................................................. H02K 1/2783
See application file for complete search history.

(56) References Cited

U.S. PATENT DOCUMENTS

2002/0180294 A1   12/2002   Kaneda et al.
2002/0180295 A1*  12/2002   Kaneda ................ H02K 1/2783
                                                310/156.43
(Continued)

FOREIGN PATENT DOCUMENTS

JP   11-308793 A    11/1999
JP   2002-354721 A  12/2002
(Continued)

OTHER PUBLICATIONS

International Search Report issued Mar. 8, 2022 in PCT/JP2022/003361, filed on Jan. 28, 2022, 2 pages.

*Primary Examiner* — Terrance L Kenerly
*Assistant Examiner* — Theodore L Perkins
(74) *Attorney, Agent, or Firm* — Oblon, McClelland, Maier & Neustadt, L.L.P.

(57) ABSTRACT

A magnet arrangement method capable of easily assembling magnets is provided. A magnet arrangement method according to one aspect of the present invention is a magnet arrangement method for arranging a plurality of magnetized magnets in a Halbach array, the method comprising: a process of forming a first magnet group by combining magnets in such a way that a direction of a magnetic force that acts on the magnets is oriented in a first direction; a process of forming a second magnet group by combining magnets in such a way that the direction of a magnetic force that acts on the magnets is oriented in a second direction that is opposite to the first direction; and a process of assembling a plurality of the first magnet groups and a plurality of the second magnet groups.

6 Claims, 9 Drawing Sheets

(56) References Cited

U.S. PATENT DOCUMENTS

| | | | |
|---|---|---|---|
| 2003/0094873 A1* | 5/2003 | Kim | H02K 1/2783 |
| | | | 310/156.43 |
| 2010/0277025 A1 | 11/2010 | Doi et al. | |
| 2014/0084731 A1* | 3/2014 | Iwami | H02K 1/02 |
| | | | 310/156.07 |
| 2016/0241120 A1 | 8/2016 | Usui | |
| 2018/0316234 A1* | 11/2018 | Ikawa | H02K 29/03 |

FOREIGN PATENT DOCUMENTS

| | | |
|---|---|---|
| JP | 2007-110822 A | 4/2007 |
| JP | 2009-261167 A | 11/2009 |
| JP | 2010-200518 A | 9/2010 |
| JP | 2016-152668 A | 8/2016 |

* cited by examiner

MAGNET ARRANGEMENT METHOD AND ROTOR MANUFACTURING METHOD

TECHNICAL FIELD

The present invention relates to a magnet arrangement method and a rotor manufacturing method.

BACKGROUND ART

An electric motor including a stator having a coil, and a rotor having magnets is known. Patent Literature 1 discloses a technique regarding an outer rotor motor that can maximize torque generated by the same current by efficiently using magnet torque by increasing an amount of magnetic flux generated by permanent magnets. Further, Patent Literature 2 discloses a technique regarding a periodic magnetic field generation apparatus including a Halbach magnet array having: a plurality of main magnetic pole permanent magnets magnetized in a direction of a generated magnetic field; sub magnetic pole permanent magnets each disposed between the main magnetic pole permanent magnets; and a back yoke that fixes these permanent magnets.

CITATION LIST

Patent Literature

[Patent Literature 1] Japanese Unexamined Patent Application Publication No. H11-308793
[Patent Literature 2] Japanese Unexamined Patent Application Publication No. 2007-110822

SUMMARY OF INVENTION

Technical Problem

When a rotor is manufactured, it is required to arrange a plurality of magnetized magnets in predetermined positions of a rotor. A Halbach array is known as a method for arranging magnets. In the Halbach array, the magnetic field intensity is maximized in a predetermined direction.

However, in a case where a Halbach array is formed by a plurality of magnetized magnets being assembled one by one in this array, a direction in which each magnet is held changes depending on the orientation of the magnetic poles of the magnet to be assembled, which causes a problem that assembling of the magnets becomes complicated.

In view of the aforementioned problem, an object of the present invention is to provide a magnet arrangement method and a rotor manufacturing method capable of easily assembling magnets.

Solution to Problem

A magnet arrangement method according to one aspect of the present invention is a magnet arrangement method for arranging a plurality of magnetized magnets in a Halbach array, the magnet arrangement method including: a process of forming a first magnet group by combining magnets in such a way that a direction of a magnetic force that acts on the magnets is oriented in a first direction; a process of forming a second magnet group by combining magnets in such a way that the direction of a magnetic force that acts on the magnets is oriented in a second direction which is opposite to the first direction; and a process of assembling a plurality of the first magnet groups and a plurality of the second magnet groups.

In the aforementioned magnet arrangement method, the first magnet group is formed by combining magnets in such a way that the direction of the magnetic force that acts on the magnets is oriented in the first direction, the second magnet group is formed by combining magnets in such a way that the direction of the magnetic force that acts on the magnets is oriented in the second direction, the plurality of first magnet groups and the plurality of second magnet groups are assembled together, and thereby the Halbach array is formed. Since the direction of the magnetic force of the first magnet group and the direction of the magnetic force of the second magnet group are opposite to each other, when the first magnet group and the second magnet group are assembled together, the direction in which the magnets are held does not change, whereby magnets may be easily assembled together.

In the aforementioned magnet arrangement method, the number of magnets that form the first magnet group may be different from the number of magnets that form the second magnet group. Accordingly, magnets may be easily assembled together.

In the aforementioned arrangement method, the plurality of magnetized magnets may be arranged in a Halbach array in an annular shape, and when the magnets arranged in the annular shape are seen in a plan view, the first direction may be a direction toward an inner side of a radial direction of the magnets arranged in the annular shape, and the second direction may be a direction toward an outer side of the radial direction of the magnets arranged in the annular shape. It is therefore possible to easily assemble magnets when a Halbach array is formed in an annular shape.

In the aforementioned magnet arrangement method, when the magnets arranged in the annular shape are seen in a plan view, the plurality of magnetized magnets may be arranged in such a manner that the orientation of magnetic poles of each of the magnets is rotated by degrees in series toward a circumferential direction, when the first direction is defined as 0 degrees, five magnets whose orientations of the magnetic poles are 0 degrees, 45 degrees, 90 degrees, 135 degrees, and 180 degrees may form the first magnet group, and three magnets whose orientations of the magnetic poles are 225 degrees, 270 degrees, and 315 degrees may form the second magnet group. It is therefore possible to easily assemble magnets when a Halbach array is formed in an annular shape.

In the aforementioned magnet arrangement method, a third magnet group may be formed by combining the at least one first magnet group with the at least one second magnet group, a plurality of the third magnet groups may be arranged with gaps therebetween, and then each of the plurality of first magnet groups may be arranged between the plurality of third magnet groups, thereby forming a Halbach array having an annular shape. It is therefore possible to easily assemble magnets when a Halbach array is formed in an annular shape.

In the aforementioned arrangement method, when the magnets arranged in the annular shape are seen in a plan view, the plurality of magnetized magnets may be arranged in such a manner that the orientation of magnetic poles of each of the magnets is rotated by 90 degrees in series toward a circumferential direction, when the first direction is defined as 0 degrees, magnets whose orientation of the magnetic poles is 0 degrees may form the first magnet group, and three magnets whose orientations of the magnetic poles is 90 degrees, 180 degrees, and 270 degrees may form the second magnet group. It is therefore possible to easily assemble magnets when a Halbach array is formed in an annular shape.

A rotor manufacturing method according to one aspect of the present invention is a rotor manufacturing method for arranging a plurality of magnetized magnets in a circumferential direction of a rotor using the aforementioned magnet arrangement method. Accordingly, magnets may be easily assembled when a rotor is manufactured.

Advantageous Effects of Invention

According to the present invention, it is possible to provide a magnet arrangement method, and a rotor manufacturing method capable of easily assembling magnets.

DESCRIPTION OF EMBODIMENTS

First Embodiment

Hereinafter, with reference to the drawings, embodiments of the present invention will be described.

FIGS. 1 to 5 are plan views each describing one example of a magnet arrangement method according to a first embodiment. The magnet arrangement method according to this embodiment is a magnet arrangement method for arranging a plurality of magnetized magnets in a Halbach array. In the following description, a case in which magnetized magnets are arranged in a Halbach array in an annular shape using the magnet arrangement method according to this embodiment will be described as an example. However, the magnet arrangement method according to this embodiment may be used also in a case where magnetized magnets are arranged in a Halbach array in a shape other than the annular shape (e.g., a linear shape).

Figure 1:
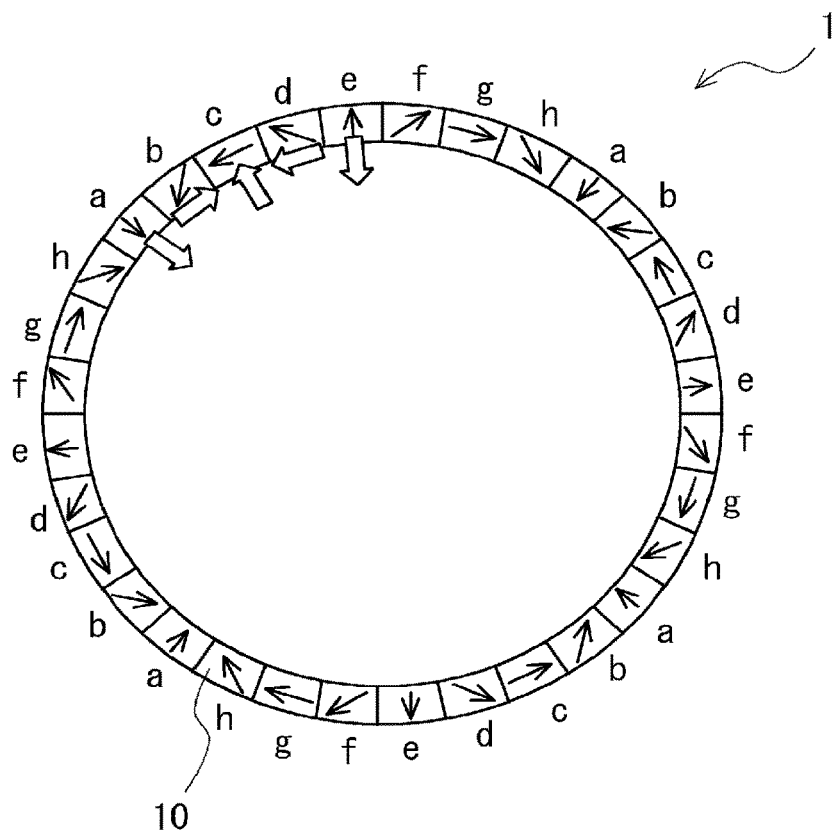
FIG. 1 is a plan view for describing one example of a magnet arrangement method according to a first embodiment.

FIG. 1 shows a state in which a plurality of magnetized magnets are arranged in a Halbach array, and shows a plurality of magnetized magnets arranged in a Halbach array in an annular shape. A Halbach array 1 shown in FIG. 1 is formed using eight kinds of magnets a to h whose orientations of the magnetic poles of magnets 10 are different from one another. In each of the magnets 10, it is assumed that the orientation of the magnetic poles is from the S pole to the N pole. The orientations of the magnetic poles are herein shown by solid arrows.

Further, in FIG. 1, an outer side is an outer side of the magnets arranged in the annular shape and an inner side is an inner side of the magnets arranged in the annular shape. Each of the magnets a to h is formed to be extended in a vertical direction (a direction that penetrates the surface of the paper). Further, the orientation of the magnetic poles of each of the magnets a to h is configured so as to be parallel to a horizontal surface (a plane parallel to the surface of the paper). It is assumed in this embodiment that the magnets are arranged in a Halbach array so that the magnetic field strength is maximized on the inner side of the magnets arranged in the annular shape. While a case in which a Halbach array is formed in such a manner that the magnetic field strength is maximized on the inner side of the magnets arranged in the annular shape will be described as an example in the following description, the Halbach array may be formed in such a manner that the magnetic field strength is maximized on the outer side of the magnets arranged in the annular shape in this embodiment. For example, by reversing the inner side and the outer side of the Halbach array shown in FIG. 1, it is possible to maximize the magnetic field strength of the outer side. Further, the invention according to this embodiment can be applicable to both a rotor of an outer rotor type and a rotor of an inner rotor type.

Figure 2:
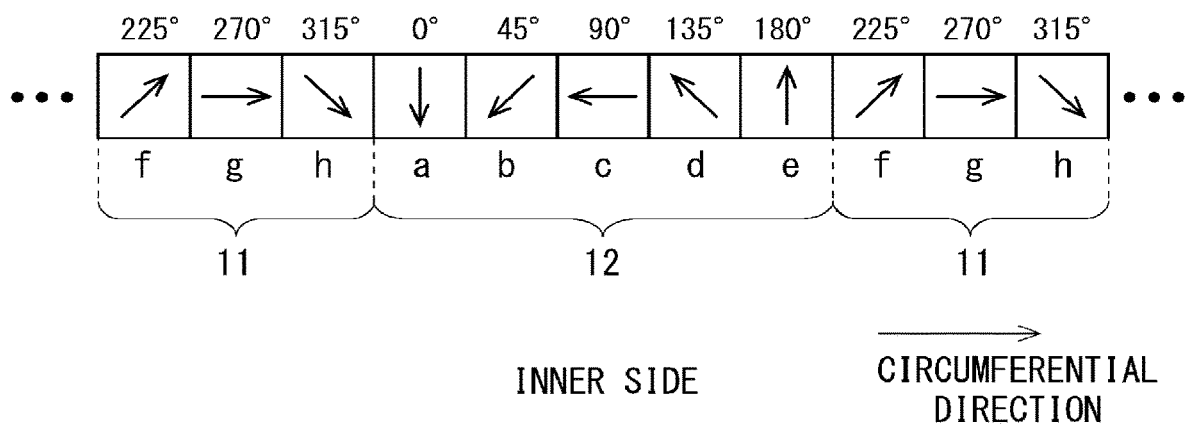
FIG. 2 is a plan view for describing one example of the magnet arrangement method according to the first embodiment.

With reference to FIG. 2, a Halbach array will be described in detail. As shown in FIG. 2, the Halbach array is formed using eight kinds of magnets a to h whose orientations of the magnetic poles are different from one another. In this embodiment, when the direction toward the inner side of the radial direction of the magnets arranged in an annular shape is defined as 0 degrees, eight kinds of magnets, namely, a magnet a whose orientation of the magnetic poles is 0 degrees, a magnet b whose orientation of the magnetic poles is 45 degrees, a magnet c whose orientation of the magnetic poles is 90 degrees, a magnet d whose orientation of the magnetic poles is 135 degrees, a magnet e whose orientation of the magnetic poles is 180 degrees, a magnet f whose orientation of the magnetic poles is 225 degrees, a magnet g whose orientation of the magnetic poles is 270 degrees, and a magnet h whose orientation of the magnetic poles is 315 degrees, are used. Note that, in the configuration example shown in FIG. 2, the direction of the rotation of the magnetic poles is a clockwise direction. Further, it is assumed that the orientation (angle) of the magnetic poles of each of the magnets a to h may vary slightly (by about a few degrees) depending on its design.

These magnets a to h are arranged in such a way that the orientation of the magnetic poles of each of the magnets is rotated by degrees in series toward a circumferential direction when the magnets arranged in the annular shape are seen in a plan view. The magnets a to h shown in FIG. 1 correspond to the magnets a to h shown in FIG. 2.

As shown in FIG. 1, a magnetic force acts on each of the magnets a to h in a predetermined direction by surrounding magnets. In the example shown in FIG. 1, for example, a magnetic force in the direction toward the inner side acts on the magnet a (the magnetic force that acts is shown by a white-out arrow, and hereinafter the same), a magnetic force toward a circumferential direction (clockwise direction) acts on the magnet b, a magnetic force toward the direction toward the outer side acts on the magnet c, a magnetic force toward the circumferential direction (counterclockwise direction) acts on the magnet d, and a magnetic force in the direction toward the inner side acts on the magnet e.

Here, the magnetic force that acts on a magnet is a force that is generated due to the orientation of the magnetic poles of each magnet. Specifically, the magnetic force that acts on a magnet is a force that is generated due to the orientation of the magnetic poles of a specific magnet and the orientations of the magnetic poles of magnets that are adjacent to the specific magnet. For example, the magnetic force in the direction toward the outer side acts on the magnet c due to the orientation of the magnetic poles of the magnet c and the orientations of the magnetic poles of the magnets b and d that are adjacent to the magnet c.

As described above, forces in different directions act on the respective magnets a to h arranged in a Halbach array, which causes a problem that assembling of the magnets becomes complicated. That is, as shown in FIG. 7, in a case where a plurality of magnetized magnets are assembled one by one to form a Halbach array, the direction in which the magnets are held changes depending on the orientation of the magnetic poles of the magnet to be assembled, which causes a problem that assembling of the magnets becomes complicated.

Figure 7:
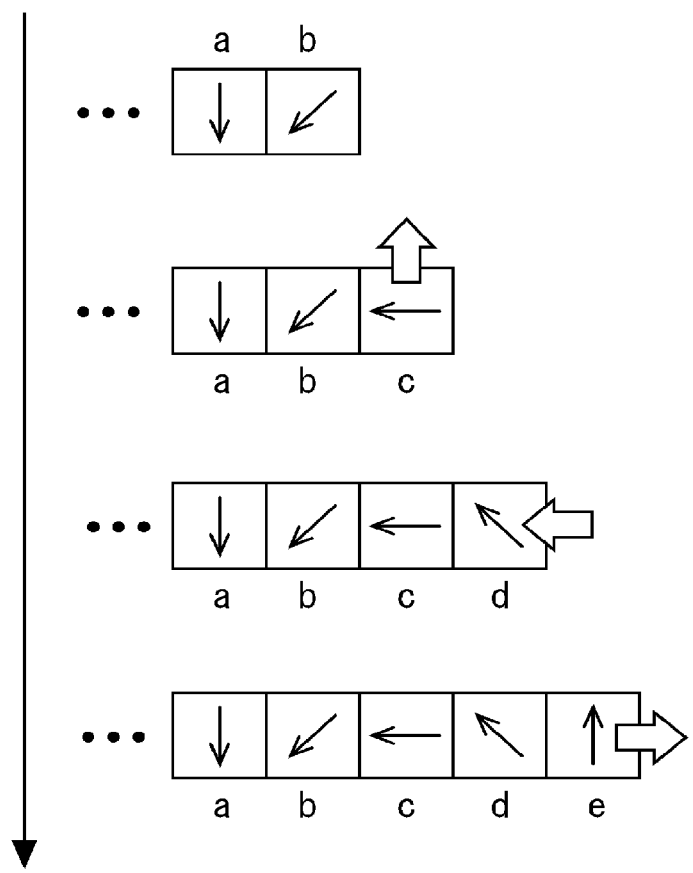
FIG. 7 is a plan view for describing one example of a magnet arrangement method according to related art.

Specifically, as shown in FIG. 7, when the magnet c is arranged next to the magnet b, an upward force on the paper acts on the magnet c. Further, when the magnet d is arranged next to the magnet c, a leftward force on the paper acts on the magnet d. Further, when the magnet e is arranged next to the magnet d, a rightward force on the paper acts on the magnet e. In this manner, in a case where a plurality of magnetized magnets are assembled one by one to form a Halbach array, the direction in which the magnets are held changes depending on the orientation of the magnetic poles of the magnet to be assembled, which causes a problem that assembling of the magnets becomes complicated.

In order to solve the aforementioned problem, in the magnet arrangement method according to this embodiment, a Halbach array is formed using the following method. That is, in the magnet arrangement method according to this embodiment, a first magnet group is formed by combining magnets in such a way that the direction of a magnetic force that acts on the magnets is oriented in a first direction. Further, a second magnet group is formed by combining magnets in such a way that the direction of a magnetic force that acts on the magnets is oriented in a second direction that is opposite to the first direction. Then, by assembling a plurality of first magnet groups and a plurality of second magnet groups, a Halbach array is formed. The number of magnets that form the first magnet group may be different from the number of magnets that form the second magnet group. Further, when the Halbach array has an annular shape, the first direction is a direction toward the inner side of the radial direction of the magnets arranged in the annular shape and the second direction is a direction toward the outer side of the radial direction of the magnets arranged in the annular shape.

Figure 3:
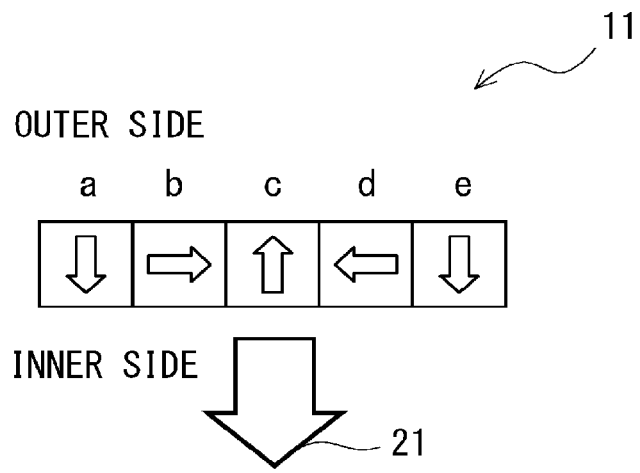
FIG. 3 is a plan view for describing one example of the magnet arrangement method according to the first embodiment.

Hereinafter, with reference to FIGS. 1-5, a magnet arrangement method according to this embodiment will be described in detail. In the magnet arrangement method according to this embodiment, first, as shown in FIG. 3, a first magnet group 11 is formed by combining five magnets a to e. That is, when the direction toward the inner side is defined as 0 degrees, the first magnet group 11 is formed using the magnet a whose orientation of the magnetic poles is 0 degrees, the magnet b whose orientation of the magnetic poles is 45 degrees, the magnet c whose orientation of the magnetic poles is 90 degrees, the magnet d whose orientation of the magnetic poles is 135 degrees, and the magnet e whose orientation of the magnetic poles is 180 degrees.

In this case, the direction of the magnetic force that acts on the magnets of the first magnet group 11 is a direction 21 toward the inner side (first direction). The direction of the magnetic force that acts on the magnets of the first magnet group 11 is a direction 21 obtained by synthesizing vectors of the magnetic forces (each of them is shown by a white-out arrow) that act on the respective magnets a to e.

Figure 4:
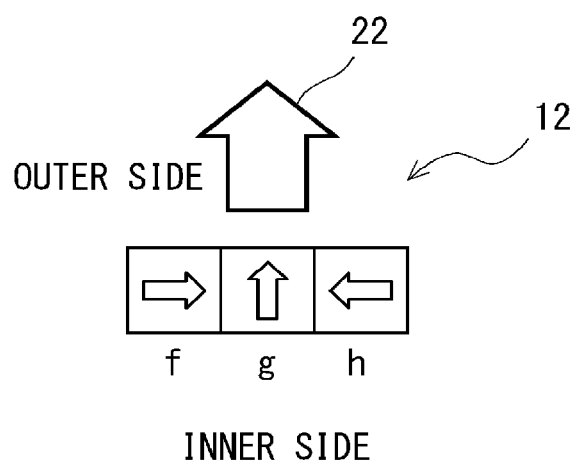
FIG. 4 is a plan view for describing one example of the magnet arrangement method according to the first embodiment.

Next, as shown in FIG. 4, the second magnet group 12 is formed by combining three magnets f to h. That is, when the direction toward the inner side is defined as 0 degrees, the second magnet group 12 is formed using the magnet f whose orientation of the magnetic poles is 225 degrees, the magnet g whose orientation of the magnetic poles is 270 degrees, and the magnet h whose orientation of the magnetic poles is 315 degrees.

At this time, the direction of the magnetic force that acts on the magnets of the second magnet group 12 is a direction 22 toward the outer side (second direction). The direction of the magnetic force that acts on the magnets of the second magnet group 12 is a direction 22 obtained by synthesizing vectors (each of them is shown by a white-out arrow) that act on the respective magnets f to h.

Figure 5:
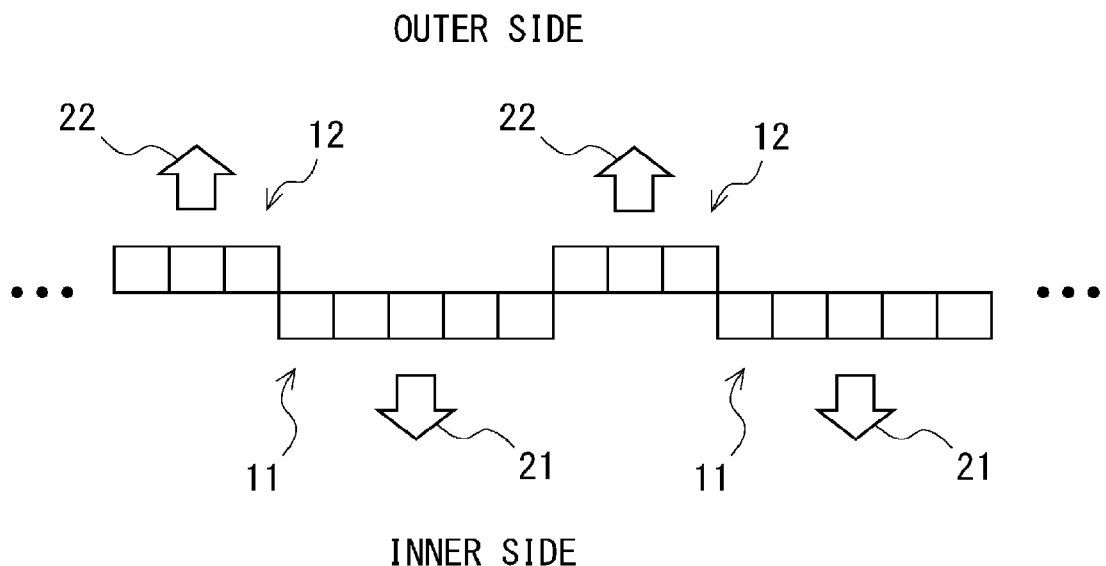
FIG. 5 is a plan view for describing one example of the magnet arrangement method according to the first embodiment.

Next, as shown in FIG. 5, a plurality of first magnet groups 11 and a plurality of second magnet groups 12 are assembled together to form a Halbach array. That is, by alternately arranging the first magnet group 11 and the second magnet group 12 and bonding them together, the Halbach array is formed. Adhesive may be used to bond these magnets.

As described above, in the magnet arrangement method according to this embodiment, the first magnet group 11 is formed by combining magnets in such a way that the direction of a magnetic force that acts on magnets is oriented in the first direction (inner side), the second magnet group 12 is formed by combining magnets in such a way that the direction of a magnetic force that acts on magnets is oriented in the second direction (outer side), the plurality of first magnet groups 11 and the plurality of second magnet groups 12 are assembled together, and thereby the Halbach array is formed. Since the direction of the magnetic force of the first magnet group 11 and the direction of the magnetic force of the second magnet group 12 are opposite to each other, when the first magnet group 11 and the second magnet group 12 are assembled together, the direction in which the magnets are held does not change, whereby magnets may be easily assembled together.

Specifically, since the direction of the magnetic force that acts on the magnets of the first magnet group 11 and the direction of the magnetic force that acts on the magnets of the second magnet group 12 are opposite to each other in the radial direction (see FIG. 5), it is possible to reduce a force that is necessary to assemble the first magnet group 11 and the second magnet group 12 in an annular shape. The order in which the first magnet group 11 and the second magnet group 12 are formed is not particularly limited.

Figure 6:
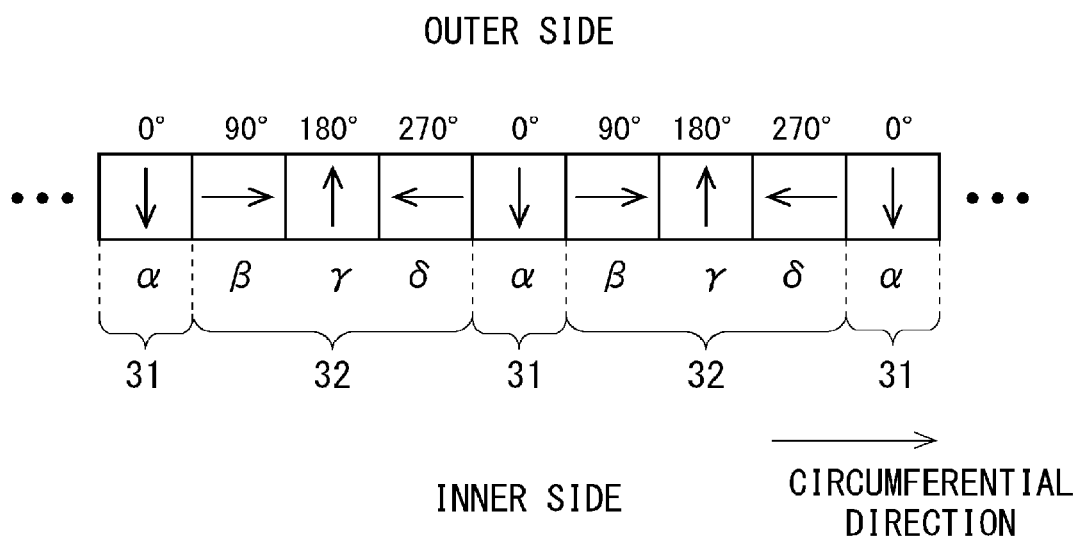
FIG. 6 is a plan view for describing another example of the magnet arrangement method according to the first embodiment.

FIG. 6 is a plan view for describing another example of the magnet arrangement method according to this embodiment. FIG. 6 shows an example in which a Halbach array is formed using four kinds of magnets α to δ whose orientations of the magnetic poles are different from one another. In a configuration example shown in FIG. 6, when the direction toward the inner side of the radial direction of the magnets arranged in an annular shape is defined as 0 degrees, four kinds of magnets, namely, a magnet α whose orientation of the magnetic poles is 0 degrees, a magnet β whose orientation of the magnetic poles is 90 degrees, a magnet γ whose orientation of the magnetic poles is 180 degrees, and a magnet δ whose orientation of the magnetic poles is 270 degrees, are used. When the magnets arranged in the annular shape are seen in a plan view, these magnets α to δ are arranged in such a manner that the orientation of the magnetic poles of each of the magnets is rotated by 90 degrees in series toward the circumferential direction. In the configuration example shown in FIG. 6, the direction of the rotation of the magnetic poles is a counterclockwise direction. Further, the orientation (angle) of the magnetic poles of each of the magnets α to δ may vary slightly (by about a few degrees) depending on its design.

When the Halbach array as shown in FIG. 6 is formed, if the direction toward the inner side is defined as 0 degrees, a first magnet group 31 is formed by using the magnet α whose orientation of the magnetic poles is 0 degrees. At this time, a direction of a magnetic force that acts on the first magnet group 31 is a direction toward the inner side (first direction). Note that, in the present invention, the first magnet group 31 may be formed using one magnet. That is, it is assumed that the "magnet group" also includes a single magnet.

Further, when it is assumed that the direction toward the inner side is 0 degrees, a second magnet group 32 is formed using three magnets, namely, the magnet β whose orientation of the magnetic poles is 90 degrees, the magnet γ whose orientation of the magnetic poles is 180 degrees, and the magnet δ whose orientation of the magnetic poles is 270 degrees. In this case, the direction of the magnetic force that acts on the magnets of the second magnet group 32 is the direction toward the outer side (second direction).

Then, a Halbach array is formed by assembling a plurality of first magnet groups 31 and a plurality of second magnet groups 32. That is, by alternately arranging the first magnet group 31 and the second magnet group 32 and bonding them together, a Halbach array is formed. Adhesive may be used to bond the magnets together.

In the configuration example shown in FIG. 6 as well, due to a similar reason, magnets may be easily assembled together.

Second Embodiment

Next, a second embodiment of the present invention will be described. In the second embodiment, a method for manufacturing a rotor using the magnet arrangement method according to the first embodiment will be described.

Figure 8:
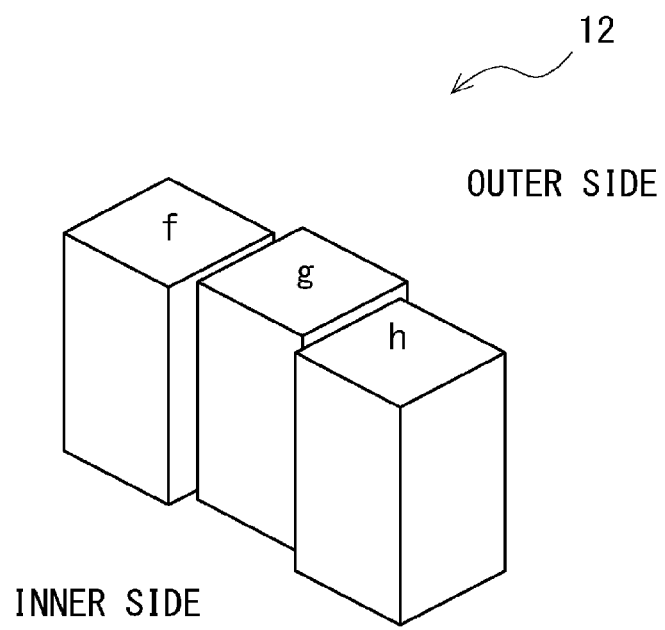
FIG. 8 is a perspective view for describing one example of a method for manufacturing a rotor according to a second embodiment.

FIG. 8 is a perspective view for describing one example of a method for manufacturing a rotor according to this embodiment, and is a diagram for describing a case in which a second magnet group 12 is formed by combining three magnets f to h. As shown in FIG. 8, when a magnet f whose orientation of the magnetic poles is 225 degrees, a magnet g whose orientation of the magnetic poles is 270 degrees, and a magnet h whose orientation of the magnetic poles is 315 degrees are arranged, a force acts on the magnet g in the direction toward the outer side. Therefore, when the three magnets f to h are arranged, the magnet g is pushed toward the inner side using a predetermined jig, and then the three magnets f to h are fixed by adhesive. By using the above-described method, the second magnet group 12 can be formed.

Figure 9:
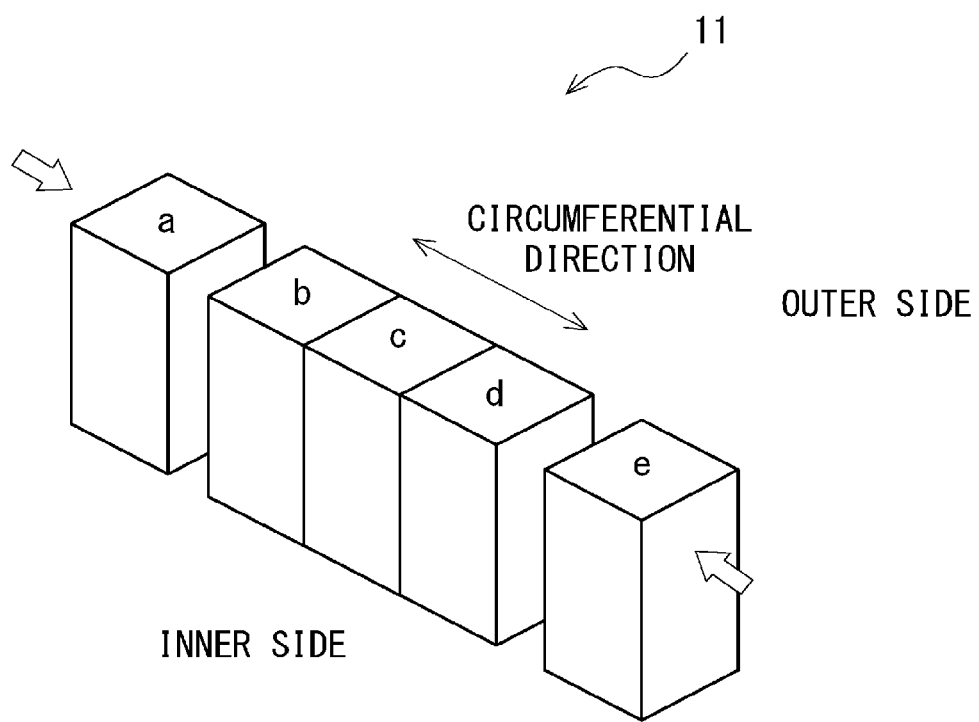
FIG. 9 is a perspective view for describing one example of the method for manufacturing the rotor according to the second embodiment.

FIG. 9 is a perspective view for describing one example of a method for manufacturing a rotor according to this embodiment, and is a diagram for describing a case in which the first magnet group 11 is formed by combining five magnets a to e. When the first magnet group 11 is formed, first, a magnet b whose orientation of the magnetic poles is 45 degrees, a magnet c whose orientation of the magnetic poles is 90 degrees, and a magnet d whose orientation of the magnetic poles is 135 degrees are arranged and fixed. In this case, a force acts on the magnet c in the direction toward the inner side, whereby the magnet c is pushed toward the outer side using a predetermined jig, and then the three magnets b to d are fixed by adhesive.

After that, each of the magnet a whose orientation of the magnetic poles is 0 degrees and a magnet e whose orientation of the magnetic poles is 180 degrees is made to come close to the three magnets b to d along the circumferential direction and they are fixed by adhesive. By using the above-described method, the first magnet group 11 can be formed.

Figure 10:
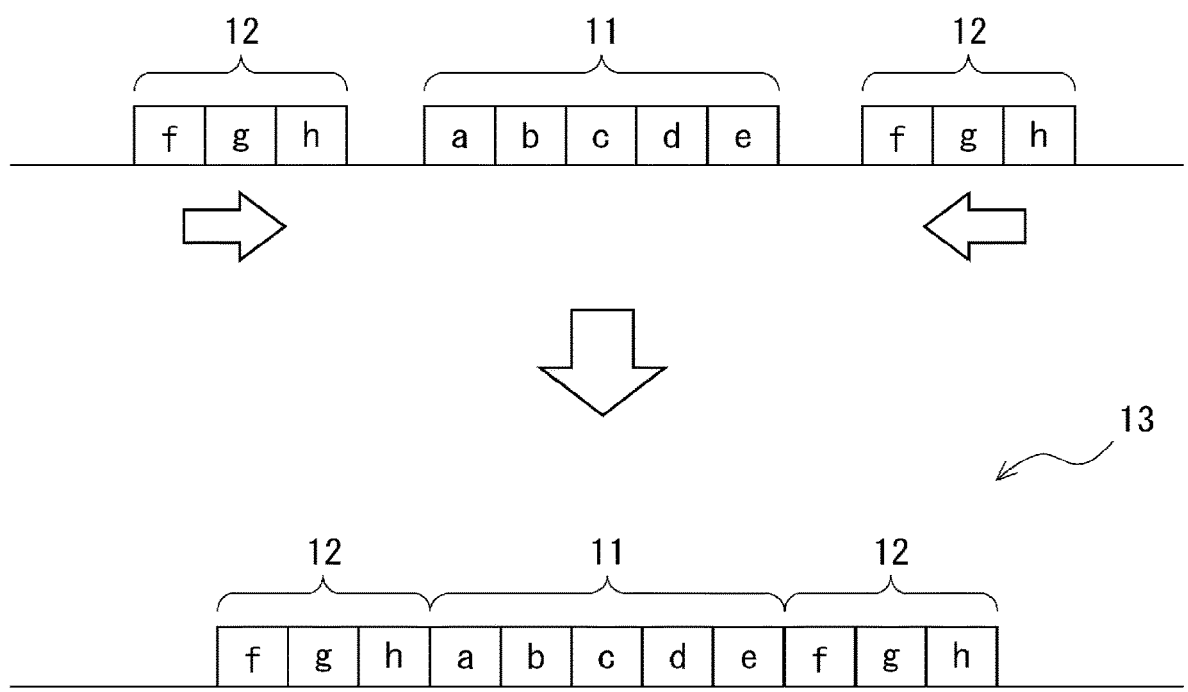
FIG. 10 is a plan view for describing one example of the method for manufacturing the rotor according to the second embodiment.

After that, as shown in FIG. 10, the first magnet group 11 and the second magnet group 12 are made to come close to each other along the circumferential direction and these magnet groups are fixed using adhesive. By using the aforementioned method, one first magnet group 11 and two second magnet groups 12 are fixed, and thereby a third magnet group 13 as shown in FIG. 10 is formed.

Note that FIG. 10 shows, as one example, a case in which a third magnet group 13 in which a total of 11 magnets are arranged using one first magnet group 11 and two second magnet groups 12. However, the number of magnets that form the third magnet group 13 may be set to any number. In other words, each of the number of first magnet groups 11 and the number of second magnet groups 12 to be used may be any number equal to or larger than one, and the numbers thereof may be set to any number.

Figure 11:
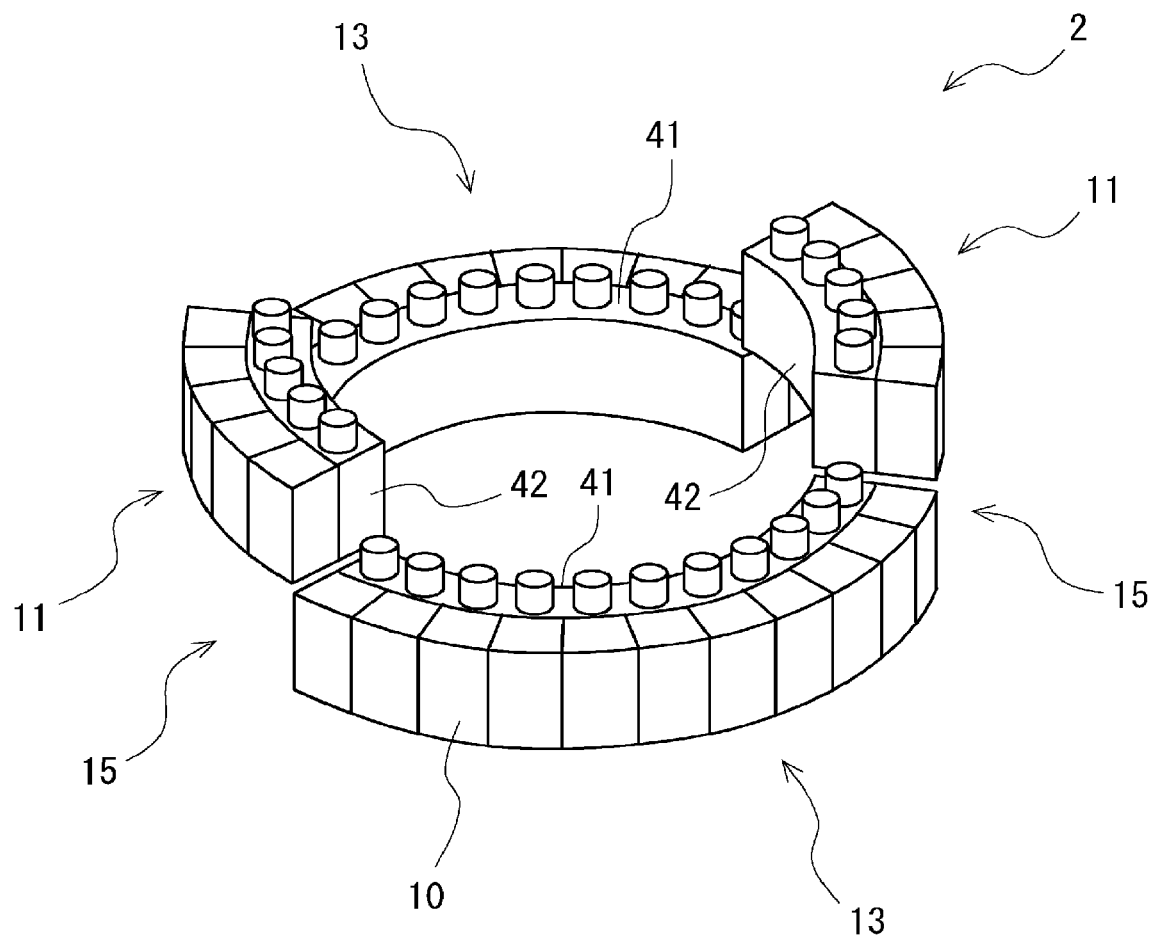
FIG. 11 is a perspective view for describing one example of the method for manufacturing the rotor according to the second embodiment.
Figure 12:
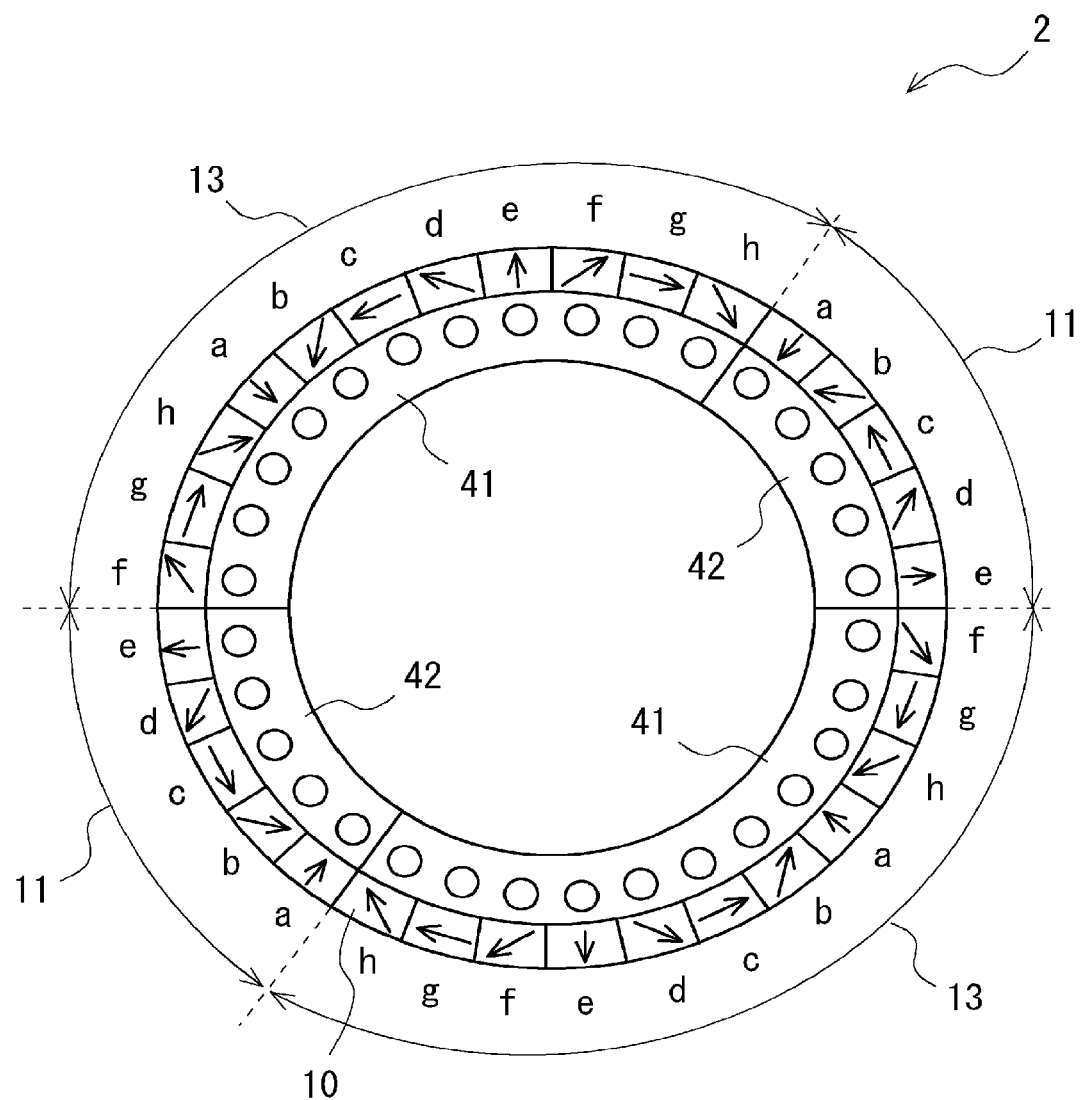
FIG. 12 is a plan view for describing one example of the method for manufacturing the rotor according to the second embodiment.

After that, as shown in FIGS. 11 and 12, magnets are arranged using jigs 41 and 42 to manufacture a rotor 2. Specifically, a plurality of third magnet groups 13 are arranged with gaps (gaps 15) therebetween, and then each of the plurality of first magnet groups 11 is arranged between the plurality of third magnet groups 13 (gaps 15), thereby a Halbach array having an annular shape is formed.

That is, the third magnet group 13 is fixed using the jig 41. Then, in the state in which the first magnet group 11 is fixed to the jig 42, the jig 42 is moved in the vertical direction to arrange the first magnet group 11 in the gap 15 of the third magnet group 13. At this time, a force toward the inner side acts on the first magnet group 11, whereby there is no need to provide a jig for holding the outer side of the first magnet group 11. Note that a rotor main body part that forms the rotor 2 is not shown in FIGS. 11 and 12 in order to describe arrangement of each of the magnets 10.

By using the above-described magnet arrangement method, a plurality of magnetized magnets may be arranged in a circumferential direction of a rotor. Further, by using the method according to this embodiment, magnets may be easily assembled together. Note that the above-described rotor manufacturing method is merely one example, and a rotor having another configuration (e.g., a rotor whose number of magnets arranged in an annular shape is different from that stated above) may be manufactured in this embodiment.

While the present invention has been described with reference to the above-described embodiments, it is needless to say that the present invention is not limited to the configurations stated in the above-described embodiments, and includes various changes, modifications, and combinations that may be performed by those skilled in the art within the scope of the claims of this application.

This application is based upon and claims the benefit of priority from Japanese Patent Application No. 2021-44585, filed on Mar. 18, 2021, the disclosure of which is incorporated herein in its entirety by reference.

REFERENCE SIGNS LIST

1 HALBACH ARRAY
2 ROTOR
11, 31 FIRST MAGNET GROUP
12, 32 SECOND MAGNET GROUP
13 THIRD MAGNET GROUP
15 GAP
41, 42 JIG

The invention claimed is:

1. A magnet arrangement method for arranging a plurality of magnetized magnets in a Halbach array, the magnet arrangement method comprising:
   a process of forming a first magnet group by combining magnets in such a way that a direction of a magnetic force that acts on the magnets is oriented in a first direction;
   a process of forming a second magnet group by combining magnets in such a way that the direction of a magnetic force that acts on the magnets is oriented in a second direction which is opposite to the first direction; and
   a process of assembling a plurality of the first magnet groups and a plurality of the second magnet groups,
   wherein a third magnet group is formed by combining at least one of the first magnet group with at least one of the second magnet group, a plurality of the third magnet groups are arranged with gaps therebetween, and then each of the plurality of first magnet groups is arranged between the plurality of third magnet groups, thereby forming a Halbach array having an annular shape.

2. The magnet arrangement method according to claim 1, wherein a number of magnets that form the first magnet group is different from a number of magnets that form the second magnet group.

3. The magnet arrangement method according to claim 1, wherein
   the plurality of magnetized magnets are arranged in a Halbach array in an annular shape, and
   when the magnets arranged in the annular shape are seen in a plan view, the first direction is a direction toward an inner side of a radial direction of the magnets arranged in the annular shape, and the second direction is a direction toward an outer side of the radial direction of the magnets arranged in the annular shape.

4. The magnet arrangement method according to claim 3, wherein
   when the magnets arranged in the annular shape are seen in a plan view, the plurality of magnetized magnets are arranged in such a manner that the orientation of magnetic poles of each of the magnets is rotated by 45 degrees in series toward a circumferential direction,
   when the first direction is defined as 0 degrees, five magnets whose orientations of the magnetic poles are 0 degrees, 45 degrees, 90 degrees, 135 degrees, and 180 degrees form the first magnet group, and
   three magnets whose orientations of the magnetic poles are 225 degrees, 270 degrees, and 315 degrees form the second magnet group.

5. The magnet arrangement method according to claim 3, wherein
   when the magnets arranged in the annular shape are seen in a plan view, the plurality of magnetized magnets are arranged in such a manner that the orientation of magnetic poles of each of the magnets is rotated by 90 degrees in series toward a circumferential direction,
   when the first direction is defined as 0 degrees, magnets whose orientation of the magnetic poles is 0 degrees form the first magnet group, and
   three magnets whose orientations of the magnetic poles is 90 degrees, 180 degrees, and 270 degrees form the second magnet group.

6. A rotor manufacturing method in which a plurality of magnetized magnets are arranged in a circumferential direction of a rotor using the magnet arrangement method according to claim 1.

* * * * *